(12) United States Patent
Nakamura et al.

(10) Patent No.: US 6,379,803 B1
(45) Date of Patent: Apr. 30, 2002

(54) LOW-REFLECTANCE GLASS ARTICLE AND PROCESS FOR PREPARING THE SAME

(75) Inventors: Koichiro Nakamura; Toshifumi Tsujino; Koji Yokoi, all of Osaka-fu (JP)

(73) Assignee: Nippon Sheet Glass Co., Ltd., Osaka-fu (JP)

( * ) Notice: Subject to any disclaimer, the term of this patent is extended or adjusted under 35 U.S.C. 154(b) by 0 days.

(21) Appl. No.: 09/230,901
(22) PCT Filed: Jun. 3, 1998
(86) PCT No.: PCT/JP98/02446
§ 371 Date: Feb. 3, 1999
§ 102(e) Date: Feb. 3, 1999
(87) PCT Pub. No.: WO98/55414
PCT Pub. Date: Dec. 10, 1998

(30) Foreign Application Priority Data

Jun. 3, 1997 (JP) .............................. 9-144970

(51) Int. Cl.[7] .............................................. C03C 17/34
(52) U.S. Cl. ................ 428/428; 359/359; 359/586; 428/212; 428/216; 428/426; 428/432; 428/697; 428/699; 428/701; 428/702
(58) Field of Search ................ 359/586, 359, 359/360; 428/432, 212, 216, 428, 426, 697, 701, 702, 699

(56) References Cited

U.S. PATENT DOCUMENTS

| | | | |
|---|---|---|---|
| 5,170,291 A | * 12/1992 | Szczybowski et al. | 359/580 |
| 5,318,830 A | * 6/1994 | Takamatsu et al. | 428/212 |
| 5,496,621 A | * 3/1996 | Makita et al. | 428/432 |
| 5,733,660 A | * 3/1998 | Makita et al. | 428/428 |
| 5,891,556 A | * 4/1999 | Anderson et al. | 428/216 |

FOREIGN PATENT DOCUMENTS

JP 09306336 A 11/1997

OTHER PUBLICATIONS

H.K. Pulker, "Coatings on Glass", 402–403. Amsterdam, Elsevier (1984). No month.

* cited by examiner

Primary Examiner—Archene Turner
(74) Attorney, Agent, or Firm—David G. Conlin; Lisa Swiszcz Hazzard; Dike, Bronstein, Roberts, and Cushman, IP Group of Edwards & Angell, LLP

(57) ABSTRACT

The present invention is a low reflection glass article which is prepared by laminating a first layer which has a middle refractive index ($n_1$) from 1.60 to 1.95 and has a film thickness of (60 to 130 nm)/$n_1$, a second layer which has a high refractive index ($n_2$) which is in a range from 1.91 to 2.60 and higher than the refractive index of said first layer by at least 0.20 and has a film thickness of (140 to 230 nm)/$n_2$, and a third layer which has a low refractive index ($n_3$) which is in a range from 1.35 to 1.59 and lower than the refractive index of said first layer by at least 0.20 and has a film thickness of (110 to 150 nm)/$n_3$ in this order on a transparent glass substrate having a refractive index from 1.47 to 1.53, wherein said second layer contains titanium oxide and other metal oxides in an amount of 70 mol % or more in total, said third layer contains a silicon oxide in an amount from 50 to 100 mol % and said metal oxides in an amount from 0 to 10 mol % in total, and said first layer contains a silicon oxide in an amount from 15 to 80 mol % and said metal oxides in an amount from 20 to 70 mol % in total.

According to the present invention, there can be provided a low reflection glass article coated with an optical multi-layer film which can reduce the reflectivity in wide visible light range.

23 Claims, 2 Drawing Sheets

LOW-REFLECTANCE GLASS ARTICLE AND PROCESS FOR PREPARING THE SAME

TECHNICAL FIELD

The present invention relates to a low reflection glass article, particularly a low reflection glass article endowed with function preventing reflection of visible light obtained by coating an optical thin film on the surface of a transparent glass substrate and a method for producing the same, and an optical filter and plasma display using the above-described low reflection glass article.

BACKGROUND ART

A reflection preventing system employing an optical thin film is used for reducing the surface reflectivity and thereby enhancing the optical properties of optical parts such as a camera and glasses, or display parts of OA electronic apparatuses such as a display panel, a display, a filter for a display and the like. These reflection preventing films are required to have a low reflectivity property and high transmission property, to enhance visibility or to further enhance the original optical properties.

The reduction in reflectivity owing to an optical thin film is caused by a light interference effect. Regarding an optical multi-layer film composed of three layers, there is known, for example, a low reflection glass article obtained by laminating a first layer having a middle refractive index (1.71) and an optical film thickness of one-fourth wave length, a second layer having a high refractive index (2.43) and an optical film thickness of half wave length, and a third layer having a high refractive index (1.39) and an optical film thickness of one-fourth wave length in this order on a transparent glass substrate (refractive index: 1.52) (for example, H. K. Pulker, "Coatings on Glass", P. 402 to 403, Amsterdam, Elsevier, 1984), and it is known that by such constitution, wave length range of which the refractive index is near zero can be enlarged and simultaneously reflection color can-be improved.

On the other hand, a plasma display panel has been recently put into practical use as a large-scale screen wall television, and development for general consumption thereof is intensive. It is known that an optical filter which has a multi-layer reflection preventing film layer for preventing reflection of a light from the outer environment and an electromagnetic wave shielding layer and corrects emitted color from PDP is placed at the front surface of this PDP. For example, there is known an optical filter which is prepared by adhering a reflection preventing film (obtained by laminating a plurality of films composed of materials having different refractive indexes, and by conducting vapor deposition on a plastic film substrate) using a transparent pressure-sensitive adhesive on one surface of a colored transparent substrate (a plate made of an acrylic resin or a polycarbonate resin which is colored to prevent violet-like appearance of emitted color tone which should be naturally blue by dispersing into the plate a pigment which absorbs excess red components emitted by PDP) and adhering (1) a film shielding an electromagnetic wave and line spectrum in near-infrared range (for example, a film obtained by sputtering a silver-inorganic oxide fine particle on the surface of a PET film) and (2) an interference fringe preventing film (for example, a film obtained by forming slight indentations and protrusions on the outer surface of a transparent film so as to prevent close fitting thereof to PDP even when it is contacted with PDP) in this order using a transparent pressure-sensitive adhesive on the other surface of the transparent substrate; the optical filter being an invention described in Japanese Laid-Open Patent Publication No. 306366 of 1997 which has been laid-open after the priority date of the current invention.

However, in the above-described optical thin film system reducing refractivity by using light interference action, facilities are in large scale since the thin films are formed by using vacuum equipment.

On the other hand, the above-described optical filter used for PDP has a problem in that production cost is high since a pigment is mixed in a resin plate, and further, a reflection preventing film is adhered on the surface.

The present invention has been accomplished for solving such problems in conventional technologies, and an object thereof is to provide a low reflection glass article coated with an optical multi-layer film which can reduce reflectivity in visible light wide range without requiring large-scale facilities.

Further, an object of the present invention is to solve the above-described problems of conventional technologies, to provide a glass article coated with a reflection preventing colored film which has excellent ability for preventing reflection of visible light, in addition, can freely control the tone of transmitted light, and has high visible light transmission, and to provide an optical filter for PDP using the same.

DISCLOSURE OF THE INVENTION

The present invention is a low reflection glass article which is prepared by laminating a first layer which has a middle refractive index ($n_1$) from 1.60 to 1.95 and has a film thickness of (60 to 130 nm) /$n_1$, a second layer which has a high refractive index ($n_2$) which is in a range from 1.91 to 2.60 and higher than the refractive index of said first layer by at least 0.20 and has a film thickness of (140 to 230 nm)/$n_2$, and a third layer which has a low refractive index ($n_3$) which is in a range from 1.35 to 1.59 and lower than the refractive index of said first layer by at least 0.20 and has a film thickness of (110 to 150 nm)/$n_3$ in this order on a transparent glass substrate having a refractive index from 1.47 to 1.53.

Further, the present invention provides a low reflection glass article, wherein said second layer contains at least one metal oxide selected from a group consisting of titanium oxide, cerium oxide, bismuth oxide, zirconium oxide, niobium oxide and tantalum oxide in an amount of 70 mol % or more in total, said third layer contains a silicon oxide in an amount from 50 to 100 mol % and said metal oxides in an amount from 0 to 10 mol % in total, and said first layer contains a silicon oxide in an amount from 15 to 80 mol % and said metal oxides in an amount from 20 to 70 mol % in total.

The present invention will be described in detail below. In the present invention, when the refractive indices (defined as a value when light having a wave length of 550 nm is used unless otherwise stated, hereinafter the same) of the first layer (middle refractive index layer), the second layer (high refractive index layer), and the third layer (low refractive index layer) laminated on the transparent glass substrate having a refractive index from 1.47 to 1.53 are expressed by $n_1$, $n_2$ and $n_3$, respectively, the refractive index ($n_1$) of the first layer (middle refractive index layer) is in a range from 1.60 to 1.95, the refractive index ($n_2$) of the second layer (high refractive index layer) is in a range from 1.91 to 2.60 and higher than the refractive index of said first layer by at least 0.20, and the refractive index ($n_3$) of the third layer (low refractive index layer) is in a range from 1.35 to 1.59 and lower than the refractive index of said first layer by at least 0.20.

It is preferable that these refractive indices are selected so that the relation represented by the following formula (1) is satisfied, namely, the value of right side is in a range from 95 to 110% of the value of left side in the formula (1). In other words, it is preferable that the refractive index $(n_1)$ of the first layer (middle refractive index layer), the refractive index $(n_2)$ of the second layer (high refractive index layer) and the refractive index $(n_3)$ of the third layer (low refractive index layer) satisfy the following formula (2).

$$n_2 \times n_3 = n_1^2 \quad (1)$$

$$0.95 \times n_2 \times n_3 \leq n_1^2 \leq 1.10 \times n_2 \times n_3 \quad (2)$$

Further, for reducing the refractive index in visible light range, the first layer has an optical film thickness from 60 to 120 nm, namely has a film thickness of (60 to 120 nm)/$n_1$, the second layer has an optical film thickness from 140 to 230 nm, namely has a film thickness of (140 to 230 nm)/$n_2$, and the third layer has an optical film thickness from 110 to 150 nm, namely has a film thickness of (110 to 150 nm)/$n_3$.

By such constitution, the refractive index of light having specific wave length allowed to be incident from the film surface side, on the surface of the film surface side can be set approximately to zero.

The extent of difference in refractive indices of each layer by the difference in wavelength of light is defined by refractive index dispersion index ν V as expressed in the following formula (3).

$$\nu = (n_{590} - 1)/(n_{590} - n_{670}) \quad (3)$$

Here, $n_{590}$ represents the refractive index at a wavelength of 590 nm and $n_{670}$ represents the refractive index at a wavelength of 670 nm.

The preferable ranges of the refractive index dispersion index ν of the first layer (middle refractive index layer), the second layer (high refractive index layer) and the third layer (low refractive index layer) are 13 to 30, 2 to 12 and 50 or more, respectively. If the refractive index dispersion index ν of each layer is out of the above-described range, low visible light reflection can not be obtained easily. The refractive indices, optical film thickness, and dispersion indices of these first to third layers are summarized in Table 1. By selecting the refractive index, optical film thickness, and dispersion index of the like, a low reflection glass article having a visible light reflection index (film surface) of 0.5% or less, preferably still, 0.3% or less, is obtained.

TABLE 1

| | Refractive index | Film thickness | Refractive index dispersion index ν |
|---|---|---|---|
| First layer | 1.60–1.95 (=n1) | (60–130)/$n_1$ | 13–30 |
| Second layer | 1.91–2.60 (=n2) | (140–230)/$n_2$ | 2–12 |
| Third layer | 1.35–1.59 (=n3) | (110–150)/$n_3$ | 50 or more |

The high refractive index film (second layer) in the present invention contains as a main component at least one oxide of metal selected from titanium (Ti), cerium (Ce), bismuth (Bi), zirconium (Zr), niobium (Nb) and tantalum (Ta), among a list of oxides of elements of the IB group (Cu, Ag, Au), IIA group (Be, Mg, Ca, Sr, Ba, Ra), IIB group (Zn, Cd, Hg), IIIA group (Sc, Y, La, Ac), IIIB group (B, Al, Ga, In, Tl), IVA group (Ti, Zr, Hf, Th), IVB group (C, Si, Ge, Sn, Pb), VA group (V, Nb, Ta, Pa), VB group (N, P, As, Sb, Bi), VIA group (Cr, Mo, W, U), VIB group (O, S, Se, Te, Po), VIIA group (Mn, Tc, Re, Np), VIII group (Fe, Co, Ni, Ru, Rh, Pd, Os, Ir, Pt, Pu, Am, Cm) of the Periodic Table of element. These metal oxides are contained in the second layer in an amount of 70 mol %, preferably 80 mol %, preferably still, 90 mol % in total in terms of $TiO_2$, $CeO_2$, $Bi_2O_3$, $ZrO_2$, $Nb_2O_5$ and $Ta_2O_5$, respectively. Silicon oxide, and coloring components described later are listed as components which may be contained in an amount of less than 30 mol %.

The low refractive index film (third layer) in the present invention contains silicon oxide (silica) in an amount from 50 to 100 mol %, and at least one oxide of metal selected from titanium (Ti), cerium (Ce), bismuth (Bi), zirconium (Zr), niobium (Nb) and tantalum (Ta) in an amount from 0 to 10 mol % in total in terms of $TiO_2$, $CeO_2$, $Bi_2O_3$, $ZrO_2$, $Nb_2O_5$ and $Ta_2O_5$, respectively. As this oxide of metal, the same kind of metal oxide contained in the above-described high refractive index film can be selected. By this selection the constriction index of the low refractive index film layer is close to the constriction index of the high refractive index film layer in curing process, and cracking and film peeling do not occur easily. Further, the close fitting at the surface between the low refractive index film and the high refractive index film layer can be enhanced. When the above-described high refractive index film contains a plurality of metal oxides, for example, two kinds of metal oxides of titanium oxide and bismuth oxide, it is preferable that titanium oxide and bismuth oxide are contained in the low refractive index film in approximately the same ratio as that for titanium oxide and bismuth oxide contained in the high refractive index film. As other components which may be contained, coloring components described later are listed.

The middle refractive index film (first layer) in the present invention contains silicon oxide (silica) in an amount from 15 to 80 mol %, and at least one oxide of metal selected from titanium (Ti), cerium (Ce), bismuth (Bi), zirconium (Zr), niobium (Nb) and tantalum (Ta) in an amount from 20 to 70 mol % in total in terms of $TiO_2$, $CeO_2$, $Bi_2O_3$, $ZrO_2$, $Nb_2O_5$ and $Ta_2O_5$, respectively. As this oxide of metal, the same kind of metal oxide contained in the above-described high refractive index film can be selected. By this selection, the constriction index of the middle refractive index film layer is near the constriction index of the high refractive index film layer in curing process, and cracking and film peeling do not occur easily. Further, the close fitting at the surface between the middle refractive index film and the high refractive index film layer can be enhanced. As one example preferable of the middle refractive index film (first layer), there is exemplified a film formed by using a liquid composition obtained by mixing the liquid compositions composing the high refractive index film (second layer) and the low refractive index film (third layer) at any ratio.

At least one of the high refractive index films, the low refractive index films and the middle refractive index films may contain a coloring component. As such a coloring component, one or more super fine particles of metal selected from elements of the IB group and VIII group of the Periodic Table of elements are listed. Among them, preferably, noble metals such as gold (Au), platinum (Pt), palladium (Pd), rhodium (Rh), silver (Ag) and the like are exemplified, and particularly preferable, gold is listed. It is preferable that these coloring components and fine metal particles are contained in an amount from 0.5 to mol %.

As one specific embodiment of the optical thin films of the high refractive index film (second layer), the middle refractive index film (first layer) and the low refractive index film (third layer) in the present invention, films containing titanium oxide, bismuth oxide and silicon oxide are exemplified. These films will be described below.

When an optical thin film containing titanium oxide, bismuth oxide and silicon oxide is used as a high refractive index film, the content of silicon oxide is 30 mol % or less, preferably 20 mol % or less, preferably still, 10 mol % or less, in terms of $SiO_2$.

The ratio of titanium oxide to bismuth oxide in the high refractive index film containing titanium oxide, bismuth oxide and silicon oxide in the present invention is preferably selected so that the maximum refractive index of the film is obtained. Regarding the contents of titanium oxide and bismuth oxide, when oxide conditions of titanium and bismuth are hypothesized as $TiO_2$ and $Bi_2O_3$, respectively, it is preferable that the ratio of $Bi_2O_3$ to the total amount of $TiO_2$ and $Bi_2O_3$, that is $Bi_2O_3/(TiO_2+Bi_2O_3)$ is from 1 to 96%, preferably still, it is from 2 to 60%, and further preferable from 3 to 50%.

Regarding the ratio of titanium oxide, bismuth oxide and silicon oxide in this high refractive index, when the mol ratio of $TiO_2$, $Bi_2O_3$ and $SiO_2$ in a $TiO_2$–$Bi_2O_3$–$SiO_2$ ternary composition is expressed by a coordinate point ($TiO_2$ mol %, $Bi_2O_3$ mol %, $SiO_2$ mol %) as shown in FIG. 1, it is required that this ratio is a ratio within a rectangle ABCD made by A(69, 1, 30), B(99, 1,0), C(5, 95,0) and D(3, 67, 30), preferably is a ratio within a rectangle EFGH made by E(78, 2, 20), F(98, 2, 0), G(40, 60, 0) and H(32, 48, 20), preferably still, is a ratio within a rectangle IJKL made by I(87, 3, 10), J(97, 3, 0), K(50, 50, 0) and L(45, 45, 10).

When the ratio of titanium oxide, bismuth oxide and silicon oxide in the high refractive index film is within a rectangle ABCD, a high refractive index film having a refractive index of 2.06 or more is obtained, when within a rectangle EFGH, a high refractive index film having a refractive index of 2.18 or more is obtained, and when within a rectangle IJKL, a high refractive index film having a refractive index of 2.30 or more is obtained. When an optical thin film containing titanium oxide, bismuth oxide and silicon oxide is thus used as the high refractive index film, other components than the above-described components, for example, cerium oxide, zirconium oxide, tantalum oxide, niobium oxide, tungsten oxide, antimony oxide and the like may be contained in small amounts, for example, in an amount of 10% or less, providing the refractive index is not largely reduced.

On the other hand, when an optical thin film containing titanium oxide, bismuth oxide and silicon oxide is used as the low refractive index film in the present invention, the content of silicon oxide is preferably 70 mol % or more, preferably still, 80 mol % or more, and further preferable at 90 mol % or more in terms of mol % of $SiO_2$.

Regarding the ratio of titanium oxide, bismuth oxide and silicon oxide in this low refractive index, when the mol ratio is expressed in the same manner as for the high refractive index film as shown in FIG. 1, it is required that this ratio is a ratio within a triangle YZA' made by Y(0, 0, 100), Z(29.5, 0.5, 70) and A'(1.5, 28.5, 70), preferably is a ratio within a triangle YB'C' made by Y(0, 0, 100), B'(19.5, 0.5, 80) and C'(8, 12, 80), and preferably still, is a ratio within a triangle YD'E' made by Y(0, 0, 100), D'(9.5, 0.5, 90) and E'(5, 5, 90).

When an optical thin film containing titanium oxide, bismuth oxide and silicon oxide is used as the middle refractive index film (first layer), regarding the ratio of titanium oxide, bismuth oxide and silicon oxide in the thin layer, if the mol ratio is expressed in the same manner as for the high refractive index film as shown in FIG. 1, it is required that this ratio is a ratio within a rectangle MNOP made by M(30.5, 0.5, 69), N(68, 1, 31), O(3.5, 65.5, 31) and P(1.5, 29.5, 69), preferably is a ratio within a rectangle QRST made by Q(39, 1, 60), R(58.5, 1.5, 40), S(24, 36, 40) and T(16, 24, 60), preferably still, is a ratio within a rectangle UVWX made by U(43, 2, 55), V(53, 2, 45), W(27.5, 27.5, 45) and X(22.5, 22.5, 55). When the ratio of titanium oxide, bismuth oxide and silicon oxide in the middle refractive index film is within a rectangle MNOP, a high refractive index film having a refractive index from 1.70 to 2.05 is obtained, when within a rectangle QRST, a middle refractive index film having a refractive index from 1.80 to 2.00 is obtained, and when within a rectangle UVWX, a middle refractive index film having a refractive index from 1.85 to 1.95 is obtained.

It is preferable that the ratio of titanium oxide to bismuth oxide when an optical thin film containing titanium oxide, bismuth oxide and silicon oxide is used as the low refractive index film (third layer), or the middle refractive index film (first layer) is near the ratio of titanium oxide to bismuth oxide of the high refractive index film (second layer) to be laminated. By this, difference in thermal constriction ratio between the middle refractive index film and the high refractive index film and difference in thermal constriction ratio between the high refractive index film and the low refractive index film in burning decrease, and cracking and film peeling can be prevented. Further, the wave length distributions of the constriction indices of the high refractive index film layer, the low refractive index film layer and the middle refractive index film layer are close to each other, and optical properties such as transmitted light tone, reflected light tone, visible light reflection index and the like in a low reflection glass obtained by laminating these optical thin layers are improved.

As other specific embodiments of the low reflection glass article of the present invention, there is exemplified a case in which the high refractive index film (second layer) contains titanium oxide, the middle refractive index film (first layer), contains titanium oxide and silicon oxide, the low refractive index film (third layer) contains a silicon oxide, and a gold fine particle is contained in at least one layer from the high refractive index film (second layer), the middle refractive index film (first layer) and the low refractive index film (third layer). This will be described below.

The components of the middle refractive index film (first layer), a reflection preventing film of the present invention will be described below. Silicon oxide (oxide of Si) is an essential component for regulating the refractive index of a film, and when the content therefore is low, the refractive index of the film is high. On the contrary, when the content is high, the refractive index of the film is low. The content of silicon oxide is from 15 to 80 mol %, preferably from 30 to 78 mol %, and preferably still, from 35 to 74 mol %, in terms of $SiO_2$. Titanium oxide is necessary for enhancing the refractive index of a film, and when the content therefore is low, the refractive index of the film is low, and when the content is high, the refractive index of the film is high. The content of titanium oxide is from 20 to 70 mol %, preferably from 22 to 65 mol %, and preferably still, from 25 to 60 mol %, in terms of $TiO_2$. When the thickness of the middle refractive index film is too small, the reflection preventing effect is low, and on the other hand, when the thickness is too large, the reflection preventing effect is low, and cracking occurs and the film strength lowers, therefore, the thickness is from 40 to 60 nm, preferably from 45 to 55 nm, more preferably from 47 to 53 nm. When the refractive index of the middle refractive index film is too low, the reflection preventing effect is not sufficiently obtained, therefore, it is preferably from 1.60 to 1.90, preferably still, from 1.65 to 1.85, and further preferable from 1.70 to 1.80.

The components of the high refractive index film (second layer) of the present invention will be described below. Titanium oxide is necessary for film forming and for enhancing the refractive index of the film, and when the content therefore is low, the refractive index of the colored film is low. On the contrary, when the content is high, the refractive index of the film is high. The content of titanium oxide is from 70 to 100 mol %, preferably from 80 to 100 mol %, and further preferable from 88 to 100 mol %, in terms of $TiO_2$. The content of silicon oxide is from 0 to 30 mol %, preferably from 0 to 20 mol %, and further preferable from 0 to 12 mol %, in terms of $SiO_2$.

When the thickness of the high refractive index film is too small, the reflection preventing effect is low, and on the other hand, when the thickness is too large, the reflection preventing effect is low, and cracking occurs and the film strength lowers, therefore, the thickness is from 65 to 105 nm, preferably from 75 to 95 nm, and further preferable from 80 to 90 nm. When the refractive index of the film is too low, the reflection preventing effect is not sufficiently obtained, therefore, it is preferably from 1.91 to 2.30, preferably still, from 1.96 to 2.30, and further preferable from 2.01 to 2.30.

The components of the low refractive index film (third layer) of the present invention will be described below. Silicon oxide is necessary for film forming and for decreasing the refractive index of the film, and when the content therefore is low, the refractive index of the film is high. On the contrary, when the content is high, the refractive index of the film is low. The content of silicon oxide is from 85 to 100 mol %, preferably from 90 to 100 mol %, in terms of $SiO_2$.

When the thickness of the low refractive index film is too small, the reflection preventing effect is low, and on the other hand, when the thickness is too large, the reflection preventing effect is low, and cracking occurs and the film strength lowers, therefore, the thickness is from 65 to 105 nm, preferably from 75 to 95 nm, and further preferable from 80 to 90 nm. When the refractive index of the film is too low, the reflection preventing effect is not sufficiently obtained, therefore, it is preferably from 1.35 to 1.59, preferably still, from 1.35 to 1.50, and further preferable from 1.35 to 1.47.

Gold imparts color to the high refractive index film, the middle refractive index film or the low refractive index film as a fine particle for coloring. When the content thereof is too small, sufficient coloring is not obtained, and on the contrary, when too large, the durability of a film lowers, and excessive gold particles discharge from the film. Therefore, the content of the gold particle is preferable from 0.5 to 20 mol %, preferably from 1 to 15 mol %, and further preferable from 1 to 11 mol %.

For forming the high refractive index film, the low refractive index film and the middle refractive index film of the present invention, a sputtering method, CVD method, spray thermal decomposition method are possible, and a sol-gel method is desirable in view of cost. For coating by the sol-gel method, a spin coating method, dip coating method, float coating method, roll coating method, gravure coating method, flexo printing method, screen printing method and the like are used.

When the high refractive index film, the low refractive index film or the middle refractive index film of the present invention is formed, for example, as an optical thin film containing titanium oxide, bismuth oxide, silicon oxide and gold particle by the sol-gel method, the coating liquid composition is obtained by dissolving in an organic solvent a metal compound which can be hydrolyzed and condensed such as a titanium compound, bismuth compound, silicon compound, cerium compound, zirconium compound, niobium compound, tantalum compound and the like, and a gold particle raw material.

As the titanium compound, a titanium alkoxide, titanium alkoxide chloride, titanium chelate and the like are used. As the titanium alkoxide, titanium methoxide, titanium ethoxide, titanium n-propoxide, titanium isopropoxide, titanium n-butoxide, titanium isobutoxide, titanium methoxy propoxide, titanium steary oxide, titanium 2-ethylhexyl oxide, and the like are exemplified. Embodiments of the titanium alkoxide chloride include titanium chloride triisopropoxide, titanium dichloride diethoxide and the like. As the titanium chelate compound, titanium triisopropoxide (2,4-pentane dionate), titanium diisopropoxide(bis-2,4-pentane dionate), titanium allyl acetate triisopropoxide, titanium bis (triethanolamine) diisopropoxide, titanium di-n-butoxide (bis-2,4-pentane dionate) and the like are used.

As the bismuth compound, bismuth nitrate, bismuth acetate, bismuth oxyacetate, bismuth acetate, bismuth chloride, bismuth alkoxide, bismuth hexafluoropentadionate, bismuth t-pentoxide, bismuth tetramethylheptane dionate and the like are used. As the cerium compound, cerium nitrate, cerium chloride and the like are used.

As the silicon compound, there is used a compound obtained by mixing a silicon alkoxide with a solvent such as alcohol and the like, and progressing hydrolysis and polymerization by using an acidic catalyst and a basic catalyst. As the silicon alkoxide, silicone methoxide, silicone ethoxide, or oligomers thereof, are used. As the acid catalyst, hydrochloric acid, sulfuric acid, nitric acid, acetic acid, oxalic acid, trichloroacetic acid, trifluoroacetic acid, phosphoric acid, hydrofluoric acid, formic acid and the like are used. As the basic catalyst, ammonia and amines are used.

Embodiments of the raw material for the fine gold particle include chloroauric acid tetrahydrate, chloroauric acid trihydrate, chloroauric acid sodium dehydrate, gold cyanide, gold potassium cyanide, gold diethylacetyl acetonate complex, gold colloid dispersion and the like are listed.

As the cerium compound, cerium organic compounds such as cerium alkoxide, cerium acetylacetonate, cerium carboxylate and the like can be suitably used. In addition, cerium inorganic compounds such as a nitrate, chloride, sulfate and the like can be used, and in view of stability, easy availability, cerium nitrate and cerium acetylacetonate are preferred.

As the zirconium compound, tetramethoxyzirconium, tetraethoxyzirconium, tetraisopropoxyzirconium, tetra n-propoxyzirconium, tetraisopropoxyzirconium isopropanol complex, tetraisobutoxyzirconium, tetra n-butoxyzirconium, tetra sec-butoxyzirconium, tetra t-butoxyzirconium and the like are suitably used. Further, alkoxides of zirconiumhalides such as zirconium monochloride trialkoxide, zirconium dichloriode dialkoxide and the like can also be used. Further, a zirconium alkoxide which is obtained by chelating the above-described zirconium alkoxide with a β-ketoester compound can also be suitably used. As the chelating agent, acetoacetates represented by $CH_3COCH_3COOR$ (wherein, R is $CH_3$, $C_2H_5$, $C_3H_7$ or $C_4H_9$) such as methyl acetoacetate, ethyl acetoacetate, propyl acetoacetate, butyl acetoacetate and the like are listed, and among them, alkyl acetoacetates, particularly methyl acetoacetate and ethyl acetoacetate are suitable since they are available at relatively low cost. The extent of chelating of the zirconium alkoxide may be partial or complete, it is preferable to conduct chelating at a molar ratio (β-ketoester)/(zirconium alkoxide)=2 because of stability of the chelate compound. Chelating agents other than the β-ketoester compound, for example, a zirconium alkoxide which has been chelated by acetylacetone is insoluble in a solvent such as alcohol and the like, and precipitated, therefore, a coating solution can not be prepared using such a chelating agent. Further, alkoxyzirconium organic acid salts can also be used which are obtained by substituting at least one of alkoxy groups in said zirconium alkoxides by organic acids such as acetic acid, propionic acid, butanoic acid, acrylic acid, methacrylic acid, steric acid and the like.

As the niobium compound, niobium pentachloride, niobium pentaethoxide and the like are used. Further, niobium trimethoxy dichloride obtained by dissolving niobium pentachloride in methyl alcohol, niobium triethoxy dichloride obtained by dissolving niobium pentachloride in ethyl alcohol, niobium triisopropoxy dichloride obtained by dissolving niobium pentachloride in isopropyl alcohol, and the like are exemplified. Further, niobium triethoxy acetylacetonate and niobium ethoxy diacetylacetonate obtained by adding acetylacetone to niobium pentaethoxide, or niobium triethoxy acetonate and niobium ethoxy diethylacetonate obtained by adding ethyl acetoacetate to niobium pentaethoxide are exemplified.

As the tantalum compound, tantalum methoxide, tantalum pentaethoxide, tantalum penta n-butoxide, tantalum tetraethoxide acetylacetonate and the like are listed.

Embodiments of the organic solvent used in a coating liquid composition used for forming the above-described high refractive index film and the low refractive index film include, though depending on the coating method, methanol, ethanol, isopropanol, butanol, hexanol, octanol, 2-methoxyethanol, 2-ethoxyethanol, 2-butoxyethanol, propylene glycol monomethyl ether, propylene glycol monoethyl glycol, cellosolve acetate, ethylene glycol, propylene glycol, diethylene glycol, diethylene glycol monoethyl ether, hexylene glycol, diethylene glycol, tripropylene glycol, polypropylene glycol, diacetone alcohol and the like. In the coating liquid composition, the above-described solvents may be used alone or in combination of two or more for controlling the viscosity, surface tension and the like of the coating liquid. Further, a stabilizer, leveling agent, thickening agent and the like may be added in small amount if necessary. The amount of the solvent used is usually regulated so that the total amount of solid components is in a range from 1 to 20%, though it depends on the thickness of the finally obtained high refractive index film, middle refractive index film and low refractive index film, and the coating method adopted.

The above-described coating liquid composition is coated according to the above-described coating method, then, dried or/and calcinated by heating at a temperature of 250° C. or more, then further, a process in which coating liquid is coated on this and a process in which drying or/and calcination with heating is conducted are repeated, to complete an ultraviolet ray and heat ray reflecting glass article. Thus, the obtained coating is excellent in properties such as transparency, atmosphere resistance, scratch resistance and the like, and if lamination is increased, film peeling and crack formation liable to be caused by differences in the thermal constriction ratio in the process of compaction of the high refractive index film layer, the middle refractive index film layer and the low refractive index film layer, can be suppressed.

A light irradiation method described below can also be used in place of the above-described method using drying and/or drying/calcination by heating at 250° C. or more. Namely, a process is conducted in which the above-described coating liquid composition is coated by the above-described coating method, then the coated film is irradiated with an electromagnetic wave having a shorter wave length than that of visible light, subsequently, a process is conducted in which the next coating liquid is coated, and this coating process and drying process sequence is repeated.

As the electromagnetic wave having a shorter wave length than that of visible light, γ-rays, X-rays and ultraviolet rays are listed, and ultraviolet rays are preferable from a practical point of view in the apparatus considering irradiation on a substrate having a large surface area. As the ultraviolet ray source, excimer lamp, low pressure mercury lamp, high pressure mercury lamp, metal halide and the like are used. It is preferable to use a high pressure mercury lamp which emits a main wave of 365 nm and efficiently emits waves of 254 nm and 303 nm, and conducts irradiation at an irradiation strength of 10 mW/cm$^2$ or more, preferably 50 mW/cm$^2$ or more, and preferably further at 100 mW/cm$^2$ or more onto a coated film. The surface of a coated film obtained by coating the coating liquid composition of the present invention is endowed with a irradiation energy of 100 mJ/cm$^2$ or more, preferably 500 mJ/cm or more, and further preferable at 1000 mJ/cm$^2$ or more using such ultraviolet sources. Coating irradiation with ultraviolet rays is repeated for the times corresponding to the number of required layers, then, if necessary, heating is conducted for 10 seconds to 2 minutes in a furnace heated at 500 to 800° C. By this, a laminated film is obtained which is excellent in properties such as transparency, atmosphere resistance, scratch resistance and the like, and in which cracking is not easily caused.

Further, drying and/or calcination by heat may be simultaneously conducted with irradiating ultraviolet rays. By conducting simultaneously a drying process by irradiation with ultraviolet rays, and a drying process by heat drying preferably at a temperature of 250° C. or lower, a coated film can be obtained which is excellent in properties such as transparency, atmosphere resistance, scratch resistance and the like, and even if lamination is increased, film peeling and crack formation liable to be caused by differences in the thermal constriction ratio in the process of compaction of the high refractive index film layer, the middle refractive index film layer, and the low refractive index film layer can be suppressed. In the above-described, increased speed of the drying process can be realized and productivity can be readily improved by utilizing irradiation with ultraviolet rays.

As the glass substrate in the present invention, a transparent glass article having a refractive index of 1.47 to 1.53, for example, a colorless and transparent glass plate having, for example, a soda lime silicate glass composition, a glass plate which is colored to green, bronze and the like, or endowed with the ability to shield ultraviolet rays or heat rays, and the like may be used, and a glass plate for an automobile and glass plate for displaying which has a thickness of 0.5 to 5.0 mm are preferably used, and the above-described laminated film can be applied on one surface or both surfaces of the glass plate.

As the glass substrate in the present invention, a transparent glass article having a refractive index of 1.47 to 1.53, for example, a colorless and transparent glass plate having, for example, a soda lime silicate glass composition, a glass plate or a transparent glass substrate in another shape which is colored to green, bronze and the like, or endowed with the ability to shield ultraviolet raya or heat rays, and the like may be used, and a glass plate for PDP or for other displays, an automobile and glass plate for buildings having a thickness of 0.5 mm to 5.0 mm are preferably used, and the above-described reflection preventing film can be applied on one surface or both surfaces of the glass plate. When both surfaces of the reflection preventing film-coated glass article in the form of a plate are in contact with air or other gases having normal pressure or reduced pressure, a reflection preventing film or a reflection preventing colored film can be coated on both surfaces of the glass plate to make the visible light reflectivity lowest. When one surface of the reflection preventing film-coated glass article in the form of a plate is, for example, in contact with or closely fitted to various panels via a plastic film, it is sufficient in many cases that a reflection preventing film is coated only on the other surface of said glass article.

A low reflection glass article obtained by coloring the reflection preventing film of the present invention, particularly, a color film-coated low reflection glass article used for a front glass of a display apparatus such as PDP, or for an automobile window, windows in buildings, preferably has transparent color wherein when expressed by the Lab color expression system, (a) has a chromaticity from −15.0 to 20.0, (b) has a chromaticity from −15.0 to 3.0, and (L) has a brightness from 40 to 90. Preferably still, the glass plate has transparent color wherein when expressed by the Lab color expression system, (a) has a chromaticity from −5.0 to 10.0, (b) has a chromaticity from −5.0 to 6.0, and (L) has a brightness from 60 to 90.

The low reflection glass article coated with a colored reflection preventing film of the present invention provides a glass article excellent in reflection reducing property, and at the same time provides a glass article excellent in design owing to the colored absorption of film. Further, the glass article coated with a colored reflection preventing film of the present invention can be combined with an electromagnetic wave shielding film and the like, and used as an optical filter which is closely fitted to the front surface of PDP. In this case, since a selective absorption film is used, an optical filter is provided which controls emitted color from PDP. For example, in PDP, since a luminescent material which emits blue color has a characteristic in that it emits a slight red component in addition to the blue colors, a part to be displayed in the blue color may be displayed in a violet-like color. In this case, the red component of the luminescent material can be absorbed by the colored film of the present invention and emitted color from the PDP can be balanced. Further, when a silver multi-layer film is used as the electromagnetic wave shielding layer, transparent color of a conventional filter turns to yellow green. In this case, by using as the reflection preventing colored film of the present invention a film of which transparent color turns to red violet, the transparent color can be controlled to a neutral gray color or blue gray color in the whole filter.

The optical filter for a plasma display panel prepared by providing an electromagnetic wave shielding layer on the opposite side of the surface on which the reflection preventing colored film has preferably transparent color wherein when expressed by the Lab color expression system, (a) has a chromaticity from −3.0 to 3.0 and (b) has a chromaticity from −3.0 to 3.0. The above-described electromagnetic wave shielding layer may be produced by a method in which copper, copper-nickel or the like which is a highly-electroconductive metal is deposited in electroless manner onto a mesh texture made of a synthetic resin, and this texture is pasted on a transparent substrate, a method in which a low resistance ITO film, a silver thin film, a multi-layer film composed of silver thin films are directly laminated on a transparent substrate, or a method in which these laminated films are pasted on a transparent substrate, in addition to the method in which a silver multi-layer film is used.

PDP has as parts thereof a front glass plate and a rear glass plate. By using as the front glass plate of PDP a glass article coated with a reflection preventing film of the present invention in which a high strain point glass plate, namely a glass plate having a strain point of 570° C. or more is used as the transparent glass substrate, the optical filter for PDP can also be employed as the front glass plate of PDP, therefore, PDP can be provided having a reflection preventing film on the surface.

BEST MODE FOR CARRYING OUT THE INVENTION

Figure 1:
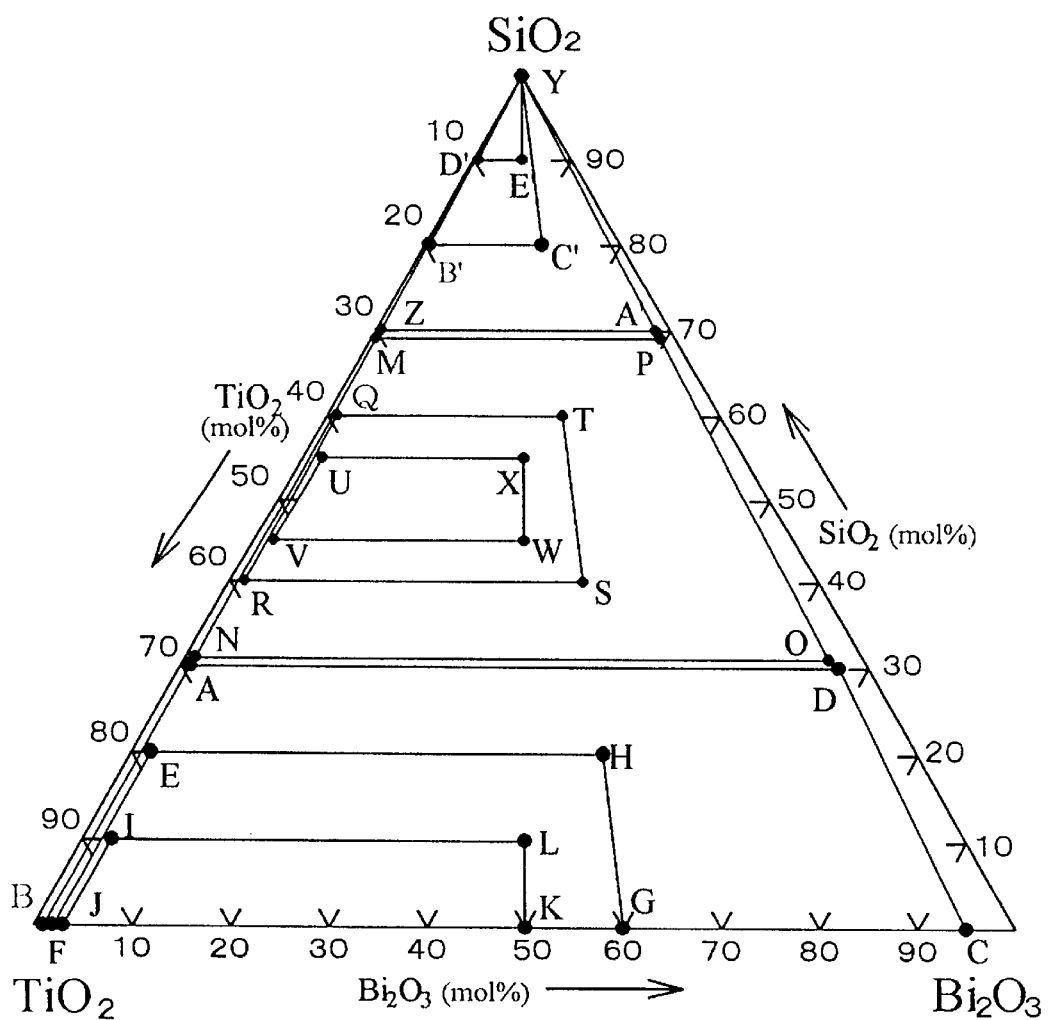
FIG. 1 is a graph showing one preferable example of each composition of a layer composed of the high refractive index film, a layer composed of the middle refractive index film and a layer composed of the low refractive index film in the present invention

The following examples further illustrate the present invention more specifically.

Production of solution composition for forming high refractive index film (H1 liquid):

24.9 g of bismuth nitrate pentahydrate (bismuth raw material) was mixed with 118.6 g of 2-ethoxyethanol, to this was added 170.7 g of tetraisopropoxytitanium (titanium raw material), and the mixture was stirred for 3 hours at 60° C. The mixture was cooled to room temperature to obtain a solution composition for forming a high refractive index film (H1 liquid). The H1 liquid contained titanium and bismuth in amounts of 96 mol % and 4 mol % in terms of $TiO_2$ and $Bi_2O_3$, respectively.

Production of solution composition for forming low refractive index film (L1 liquid):

150 g of ethyl silicate ("ETHYL SILICATE 40" manufactured by COLCOAT Ltd.) was mixed with 132 g of ethyl cellosolve, to this was added 18 g of 0.1 mol/l hycrochloric acid, and the mixture was stirred for 2 hours at room temperature (L1 liquid).

Production of solution composition for forming high refractive index film (H2 liquid):

The L1 liquid was mixed with the H1 liquid so that the amount of $SiO_2$ was 10 mol % in terms of oxide, to obtain a solution composition for forming a high refractive index film (H2 liquid). The H2 liquid contained silicon, titanium and bismuth in amounts of 10 mol %, 88.2 mol % and 1.8 mol % in terms of $SiO_2$, $TiO_2$ and $Bi_2O_3$, respectively.

Production of solution composition for forming high refractive index film (H3 liquid):

The L1 liquid was mixed with the H1 liquid so that the amount of $SiO_2$ was 30 mol % in terms of oxide, to obtain a solution composition for forming a high refractive index film (H3 liquid). The H3 liquid contained silicon, titanium and bismuth in amounts of 30 mol %, 68.6 mol % and 1.4 mol % in terms of $SiO_2$, $TiO_2$ and $Bi_2O_3$, respectively.

Production of solution composition for forming middle refractive index film (M1 liquid):

The L1 liquid was mixed with the H1 liquid so that the amount of $SiO_2$ was 50 mol % in terms of oxide, to obtain a solution composition for forming a middle refractive index film (M1 liquid). The M1 liquid contained silicon, titanium and bismuth in amounts of 50 mol %, 49 mol % and 1 mol % in terms of $SiO_2$, $TiO_2$ and $Bi_2O_3$, respectively.

Production of solution composition for forming middle refractive index film (M2 liquid):

The L1 liquid was mixed with the H1 liquid so that the amount of $SiO_2$ was 70 mol % in terms of oxide, to obtain a solution composition for forming a middle refractive index film (M2 liquid). The M2 liquid contained silicon, titanium and bismuth in amounts of 70 mol %, 29.4 mol % and 0.6 mol % in terms of $SiO_2$, $TiO_2$ and $Bi_2O_3$, respectively.

Production of solution composition for forming low refractive index film (L2 liquid):

The L1 liquid was mixed with the H1 liquid so that the amount of $SiO_2$ was 90 mol % in terms of oxide, to obtain a solution composition for forming a low refractive index film (L2 liquid). The L2 liquid contained silicon, titanium and bismuth in amounts of 90 mol %, 9.8 mol % and 0.2 mol % in terms of $SiO_2$, $TiO_2$ and $Bi_2O_3$, respectively.

Production of solution composition for forming high refractive index film (H4 liquid):

Chloroauric acid was dissolved in an amount of 1% in terms of % by weight into the H1 liquid, to obtain a solution composition for forming a low refractive index film containing a coloring component (H4 liquid).

Production of solution composition for forming low refractive index film (L3 liquid):

Chloroauric acid was dissolved in an amount of 1% in terms of % by weight into the L2 liquid, to obtain a solution composition for forming a low refractive index film containing a coloring component (L3 liquid).

Production of solution composition for forming middle refractive index film (M3 liquid):

Chloroauric acid was dissolved in an amount of 1% in terms of % by weight into the M2 liquid, to obtain a solution composition for forming a low refractive index film containing a coloring component (M3 liquid).

Embodiments 1 through 23, Comparative Examples 1 through 6

A colorless transparent soda lime glass plate (thickness: 1.1 mm, visible light transmission: 91.2%, visible light reflectivity (only surface of incident light side, Incident angle: 12°): 4.03%, visible light reflectivity (both surfaces, Incident angle: 12 ): 8.05%. When expressed by the Lab color expression system, transmitted light chromaticity: a=−0.39, b=0.2, transmitted light brightness $((a^2+b^2)^{1/2})$=0.44, reflected light chromaticity only by incident light side surface: a=0.08, b=−0.31, reflected light brightness $((a^2+b^2)^{1/2})$=0.32, reflected light chromaticity (both surfaces) : a=0.02, b=−0.40, reflected light brightness $((a^2+b^2)^{1/2})$=0.40) was washed with an aqueous alkaline solution for 20 minutes, then with ultra pure water for 20 minutes, respectively with being irradiated with an ultrasonic wave, to obtain a substrate.

The above-described M1 liquid was coated on one surface of this substrate by a glavure coating method, and irradiated with ultraviolet rays for 30 seconds by using a 160 W/cm high pressure mercury lamp from a distance of 10 cm at an irradiation strength of 15 mW/cm$^2$, to form a first layer film.

Then, the above-described H1 liquid was coated on said first layer film, and ultraviolet ray irradiation was conducted using the same high pressure mercury lamp at the same distance, irradiation strength and irradiation time, respectively, to obtain a second layer. Then, the above-described L2 liquid was coated on said second layer, and ultraviolet ray irradiation was conducted using the same high pressure mercury lamp under the same conditions, to obtain a third layer. This was heated for 30 seconds in an electric oven heated at 720° C., to obtain a low reflection glass plate in which the first layer film, the second layer film and the third layer film are laminated in this order on the surface of the substrate. By changing roll rotations in the gravure coating method for the first layer, the second layer and the third layer, to obtain various low reflection glass plates having different optical film thickness (Embodiments 1 through 6, Comparative Examples 1 through 6).

Further, the same procedures were conducted likewise in Embodiments 1 through 6 except that the H2 liquid was used instead of the H1 liquid in the second layer liquid (Embodiments 7 through 12). Further, the same procedure was conducted likewise in Embodiment 1 except that the H3 liquid was used instead of the H1 liquid in the second layer liquid (Embodiment 13).

The same procedures were conducted likewise in Embodiments 1 through 6 except that the M2 liquid and the H3 liquid were used, respectively instead of the M1 liquid in the first layer liquid and the H1 liquid in the second layer liquid (Embodiments 14 through 16). Further, the same procedures were conducted likewise in Embodiments 14 through 16 except that the L1 liquid was used as the third layer liquid (Embodiments 17 through 23).

Regarding the optical properties of the resulted low reflection glass plate, the visible light reflectivity Rvis and the visible light transmission Tvis were measured according to JIS Z 8722, and the visible light reflectivity was measured as a reflectivity at a 12° incident angle. Here, the visible light reflectivity only by film surface (one side) of light incidented from the film surface side was expressed by R(S) vis, and the visible light reflectivity on both surfaces including the reflection on the film surface and the reflection on the rear surface of light incidented from the film surface side was expressed by R(D)vis. For each of the first to third layers, the refractivity (n) was measured by ellipsometry as a refractivity value for light having a wave length of 550 nm, the film composition is shown in Table 2, the refractivity (n), the refractivity dispersion index (v) defined by formula 6, the film thickness (d) and the optical film thickness (nd) are shown in Tables 3 and 4. The visible light reflectivity R(S)vis for only film surface, chromaticity a and b and reflected light brightness $((a^2+b^2)^{1/2})$ of light incidented from the film surface side when expressed by the Lab color expression system are shown in Tables 5 and 6, the visible light reflectivity R(D)vis for both surfaces including also the rear surface, chromaticity a and b and reflected light brightness $((a^2+b^2)^{1/2})$ of light incidented from the film surface side on both surfaces including also the rear surface are shown in Tables 7 and 8, and the visible light transmission Tvis when light incidents from the film surface side, chromaticity a and b and transmitted light brightness $((a^2+b^2)^{1/2})$ are shown in Tables 9 and 10, respectively. The visible light reflectivity and reflected light chromaticity for only the film surface (one side) were measured so that light reflection on the rear surface did not occur by making the rear surface (non-film surface) of the glass plate a rough surface and by coating and curing with a black paint.

Figure 2:
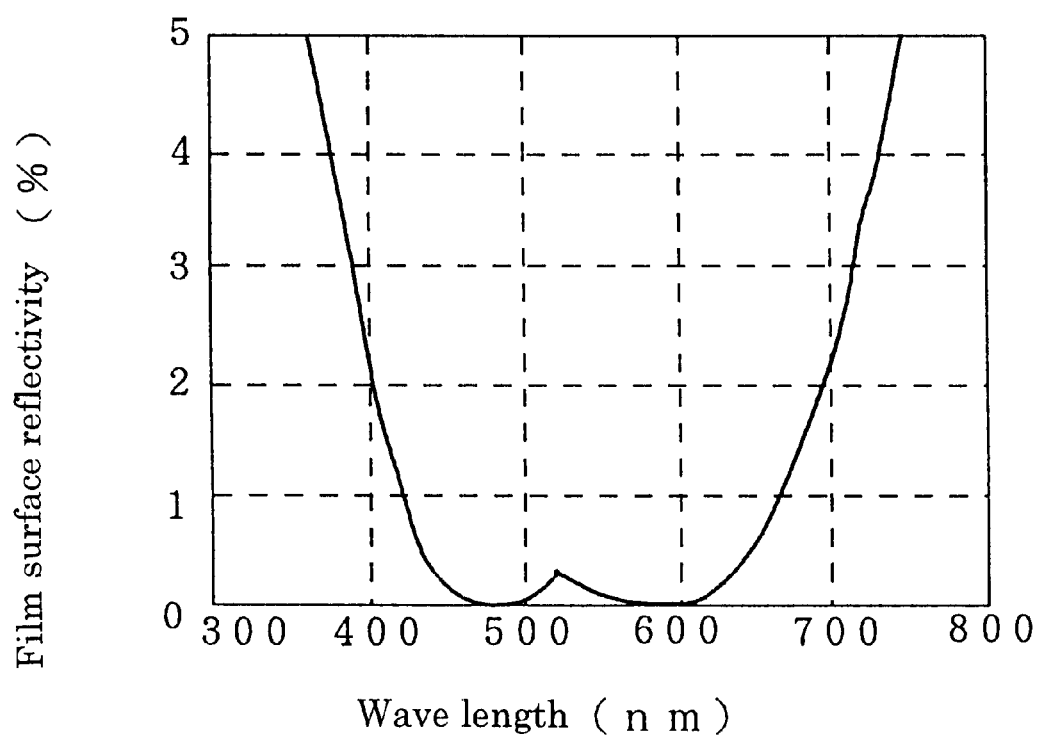
FIG. 2 is a graph showing reflectivity spectroscopic property of one example of the low reflectivity glass article of the present invention.

The spectroscopic properties of the reflected light on the film surface when the light incidented from the film surface regarding the low reflection glass plate of Embodiment 1 are shown in FIG. 2. From the figure, it is known that the reflectivity of the lights having a wave length of 480 nm and 590 nm are both 0.01% or less, and the reflectivity of the light having a wave length of 550 nm is 0.13%.

As shown in Embodiments 1 through 23, the visible light reflectivity R(S)vis on the film surface of the low reflection glass plate when light incidented from the film surface side is 0.12 to 0.48%, namely not more than 0.5%, is very small as compared with 4.03% which is the visible light reflectivity (only by the surface of incident light) of the untreated glass substrate, therefore, it is known that the effect for preventing visible light reflection is high. In contrast, in Comparative Examples 1 through 6 of which film thickness of said each layer is out of range, the visible light reflectivity R(S)vis on the film surface side is 1.04 to 1.91%, and smaller as compared with the visible light reflectivity (only by the surface of incident light) of the untreated glass substrate, however, significantly larger than that of the Embodiments.

Also, regarding the visible light reflectivity R(D)vis on both surfaces including the rear surface, the values are 4.09 to 4.47% in Embodiments 1 through 2, and smaller than 8.05% on the untreated glass substrate. The brightness of the reflective light on both surfaces including the rear surface in Embodiments 1 through 24 is in a range from 0.26 to 3.82, namely not more than 5.0, the change from 0.40 which is the value obtained on the untreated plate is very small, and reflected color near neutral gray is exhibited. Further, the visible light transmission Tvis in Embodiments 1 through 23 is from 92.3 to 93.8%, exhibiting higher value than 91.2% which is the visible light transmission Tvis of the untreated plate.

Embodiment 24

The same procedure was conducted likewise in Embodiment 1 except that the M1 liquid, the H1 liquid and the L2 liquid were substituted, respectively, by the M3 liquid, the H4 liquid, and the L3 liquid. The resulted low reflection glass exhibited pale gray transmitted color tone, and the R(S)vis value was 0.11% and the Tvis value was 90.2%.

TABLE 2

| Embodiment/ Comparative Examples | Layer | Liquid used | Film composition of each layer (mol %) | | |
|---|---|---|---|---|---|
| | | | $SiO_2$ | $TiO_2$ | $Bi_2O_3$ |
| Embodiment 1–6 Comparative Examples 1–6 | First layer | M1 liquid | 50 | 49 | 1 |
| | Second layer | H1 liquid | 0 | 96 | 4 |
| | Third layer | L2 liquid | 90 | 9.8 | 0.2 |
| Embodiments 7–12 | First layer | M1 liquid | 50 | 49 | 1 |
| | Second layer | H2 liquid | 10 | 88.2 | 1.8 |
| | Third layer | L2 liquid | 90 | 9.8 | 0.2 |
| Embodiment 13 | First layer | M1 liquid | 50 | 49 | 1 |
| | Second layer | H3 liquid | 30 | 68.6 | 1.4 |
| | Third layer | L2 liquid | 90 | 9.8 | 0.2 |
| Embodiments 14–16 | First layer | M2 liquid | 70 | 29.4 | 0.6 |
| | Second layer | H3 liquid | 30 | 68.6 | 1.4 |
| | Third layer | L2 liquid | 90 | 9.8 | 0.2 |
| Embodiments 17–23 | First layer | M2 liquid | 70 | 29.4 | 0.6 |
| | Second layer | H3 liquid | 30 | 68.6 | 1.4 |
| | Third layer | L1 liquid | 100 | 0 | 0 |

TABLE 3

| Embodiment No. | First layer | | | | Second layer | | | | Third layer | | | |
|---|---|---|---|---|---|---|---|---|---|---|---|---|
| | n | υ | Film thickness d(nm) | nd (nm) | n | υ | Film thickness d(nm) | nd (nm) | n | υ | Film thickness d(nm) | nd (nm) |
| 1 | 1.89 | 14.15 | 51 | 96 | 2.37 | 5.19 | 84 | 199 | 1.49 | >100 | 83 | 124 |
| 2 | 1.89 | 14.15 | 41 | 77 | 2.37 | 5.19 | 84 | 199 | 1.49 | >100 | 83 | 124 |
| 3 | 1.89 | 14.15 | 61 | 115 | 2.37 | 5.19 | 84 | 199 | 1.49 | >100 | 83 | 124 |
| 4 | 1.89 | 14.15 | 51 | 96 | 2.37 | 5.19 | 74 | 175 | 1.49 | >100 | 83 | 124 |
| 5 | 1.89 | 14.15 | 51 | 96 | 2.37 | 5.19 | 94 | 223 | 1.49 | >100 | 83 | 124 |
| 6 | 1.89 | 14.15 | 51 | 96 | 2.37 | 5.19 | 84 | 199 | 1.49 | >100 | 93 | 139 |
| 7 | 1.89 | 14.15 | 52 | 98 | 2.33 | 5.82 | 82 | 190 | 1.49 | >100 | 84 | 125 |
| 8 | 1.89 | 14.15 | 42 | 79 | 2.33 | 5.82 | 84 | 196 | 1.49 | >100 | 83 | 124 |
| 9 | 1.89 | 14.15 | 62 | 117 | 2.33 | 5.82 | 84 | 196 | 1.49 | >100 | 83 | 124 |
| 10 | 1.89 | 14.15 | 52 | 98 | 2.33 | 5.82 | 72 | 167 | 1.49 | >100 | 84 | 125 |
| 11 | 1.89 | 14.15 | 52 | 98 | 2.33 | 5.82 | 92 | 214 | 1.49 | >100 | 83 | 124 |
| 12 | 1.89 | 14.15 | 52 | 98 | 2.33 | 5.82 | 82 | 190 | 1.49 | >100 | 94 | 140 |

TABLE 3-continued

| | First layer | | | | Second layer | | | | Third layer | | | |
|---|---|---|---|---|---|---|---|---|---|---|---|---|
| Embodiment No. | n | υ | Film thickness d(nm) | nd (nm) | n | υ | Film thickness d(nm) | nd (nm) | n | υ | Film thickness d(nm) | nd (nm) |
| 13 | 1.89 | 14.15 | 51 | 96 | 2.06 | 9.36 | 84 | 173 | 1.49 | >100 | 83 | 124 |
| 14 | 1.71 | >100 | 71 | 122 | 2.06 | 9.36 | 67 | 139 | 1.49 | >100 | 88 | 131 |
| 15 | 1.71 | >100 | 61 | 104 | 2.06 | 9.36 | 94 | 193 | 1.49 | >100 | 80 | 119 |
| 16 | 1.71 | >100 | 57 | 98 | 2.06 | 9.36 | 62 | 127 | 1.49 | >100 | 83 | 123 |
| 17 | 1.71 | >100 | 60 | 102 | 2.06 | 9.36 | 94 | 193 | 1.46 | >100 | 83 | 121 |
| 16 | 1.71 | >100 | 49 | 83 | 2.06 | 9.36 | 94 | 193 | 1.46 | >100 | 83 | 121 |
| 19 | 1.71 | >100 | 40 | 68 | 2.06 | 9.36 | 94 | 193 | 1.46 | >100 | 83 | 121 |
| 20 | 1.71 | >100 | 70 | 119 | 2.06 | 9.36 | 94 | 193 | 1.46 | >100 | 83 | 121 |
| 21 | 1.71 | >100 | 80 | 136 | 2.06 | 9.36 | 94 | 193 | 1.46 | >100 | 83 | 121 |
| 22 | 1.71 | >100 | 60 | 102 | 2.06 | 9.36 | 74 | 152 | 1.46 | >100 | 83 | 121 |
| 23 | 1.71 | >100 | 49 | 84 | 2.06 | 9.36 | 87 | 179 | 1.46 | >100 | 86 | 125 |

TABLE 4

| | First layer | | | | Second layer | | | | Third layer | | | |
|---|---|---|---|---|---|---|---|---|---|---|---|---|
| No. | $n_1$ | υ | Film thickness d(nm) | $n_1 \cdot d$ nm | $n_2$ | υ | Film thickness d(nm) | $n_2 \cdot d$ (nm) | $n_3$ | 98 | Film thickness d(nm) | $n_3 \cdot d$ (nm) |
| Comparative Example | | | | | | | | | | | | |
| 1 | 1.89 | 14.15 | 31 | 58 | 2.37 | 5.19 | 199 | 84 | 1.49 | >100 | 83 | 124 |
| 2 | 1.89 | 14.15 | 80 | 152 | 2.37 | 5.19 | 199 | 84 | 1.49 | >100 | 83 | 124 |
| 3 | 1.89 | 14.15 | 51 | 96 | 2.37 | 5.19 | 128 | 54 | 1.49 | >100 | 83 | 124 |
| 4 | 1.89 | 14.15 | 51 | 96 | 2.37 | 5.19 | 246 | 104 | 1.49 | >100 | 83 | 124 |
| 5 | 1.89 | 14.15 | 51 | 96 | 2.37 | 5.19 | 199 | 84 | 1.49 | >100 | 64 | 95 |
| 6 | 1.89 | 14.15 | 51 | 96 | 2.37 | 5.19 | 246 | 104 | 1.49 | >100 | 103 | 154 |

TABLE 5

| | Visible light Reflectivity (film surface) | Reflected light chromaticity (film surface) | | |
|---|---|---|---|---|
| Embodiment No. | R(S)vis(%) | a | b | $(a^2 + b^2)^{1/2}$ |
| 1 | 0.14 | 1.48 | −0.92 | 1.74 |
| 2 | 0.43 | −0.72 | 1.45 | 1.62 |
| 3 | 0.24 | 6.49 | 8.82 | 10.95 |
| 4 | 0.29 | 9.06 | −0.81 | 9.10 |
| 5 | 0.48 | −3.56 | 1.08 | 3.72 |
| 6 | 0.48 | 3.22 | −8.12 | 8.74 |
| 7 | 0.13 | 1.57 | −0.79 | 1.76 |
| 8 | 0.38 | 0.40 | −0.66 | 0.77 |
| 9 | 0.26 | 5.22 | −6.81 | 8.58 |
| 10 | 0.23 | 8.39 | −0.92 | 8.44 |
| 11 | 0.40 | −2.80 | 1.36 | 3.11 |
| 12 | 0.48 | 2.17 | −7.72 | 8.02 |
| 13 | 0.14 | 1.48 | −0.92 | 1.74 |
| 14 | 0.27 | 11.86 | −10.09 | 15.57 |
| 15 | 0.35 | 3.91 | −3.98 | 4.29 |
| 16 | 0.38 | 8.75 | −10.30 | 13.51 |
| 17 | 0.19 | 5.74 | −6.38 | 8.58 |
| 18 | 0.24 | 3.86 | −8.48 | 9.32 |
| 19 | 0.38 | 3.82 | −10.79 | 11.45 |
| 20 | 0.23 | 8.41 | −5.78 | 10.20 |
| 21 | 0.37 | 10.38 | −6.83 | 12.43 |
| 22 | 0.45 | 10.24 | −1.50 | 10.35 |
| 23 | 0.12 | 3.82 | −3.25 | 5.02 |

TABLE 6

| | Visible light Reflectivity (film surface) | Reflected light chromaticity (film surface) | | |
|---|---|---|---|---|
| Comparative Example No. | R(S)vis(%) | a | b | $(a^2 + b^2)^{1/2}$ |
| 1 | 1.04 | 0.47 | −0.71 | 0.85 |
| 2 | 1.44 | 8.36 | −12.10 | 14.71 |
| 3 | 1.76 | 9.52 | 2.56 | 9.86 |
| 4 | 1.19 | −2.99 | 2.42 | 3.85 |
| 5 | 1.91 | 1.71 | −0.85 | 1.91 |
| 6 | 1.59 | 3.91 | −10.40 | 11.11 |

TABLE 7

| | Visible light Reflectivity (both surfaces) | Reflected light chromaticity (both surfaces) | | |
|---|---|---|---|---|
| Embodiment No. | R(D)vis(%) | a | b | $(a^2 + b^2)^{1/2}$ |
| 1 | 4.12 | 0.18 | −0.57 | 0.60 |
| 2 | 4.39 | −0.26 | −0.005 | 0.26 |
| 3 | 4.21 | 1.37 | −2.33 | 2.70 |
| 4 | 4.26 | 2.12 | −0.59 | 2.20 |
| 5 | 4.43 | −1.16 | −0.07 | 1.16 |
| 6 | 4.42 | 0.90 | −2.84 | 2.98 |
| 7 | 4.09 | 0.24 | −0.62 | 0.66 |
| 8 | 4.33 | 0.10 | −0.68 | 0.69 |

TABLE 7-continued

| Embodiment No. | Visible light Reflectivity (both surfaces) R(D)vis(%) | Reflected light chromaticity (both surfaces) | | |
|---|---|---|---|---|
| | | a | b | $(a^2 + b^2)^{1/2}$ |
| 9 | 4.21 | 1.18 | −2.02 | 2.34 |
| 10 | 4.19 | 1.80 | −0.67 | 1.92 |
| 11 | 4.40 | 0.64 | −2.80 | 2.87 |
| 12 | 4.12 | 0.18 | −0.57 | 0.60 |
| 13 | 4.12 | 0.18 | −0.57 | 0.60 |
| 14 | 4.21 | 2.71 | −2.53 | 3.71 |
| 15 | 4.21 | −1.31 | −2.53 | 2.85 |
| 16 | 4.33 | 2.37 | −3.00 | 3.82 |
| 17 | 4.21 | 1.06 | −1.55 | 1.88 |
| 18 | 4.27 | 0.80 | −2.18 | 2.32 |
| 19 | 4.41 | 0.99 | −3.26 | 3.41 |
| 20 | 4.25 | 1.76 | −1.55 | 2.35 |
| 21 | 4.37 | 2.74 | −2.12 | 3.46 |
| 22 | 4.47 | 2.95 | −0.72 | 3.04 |
| 23 | 4.19 | 0.54 | −0.98 | 1.12 |

TABLE 8

| Comparative Example No. | Visible light Reflectivity (both surfaces) R(D)vis(%) | Reflected light chromaticity (both surfaces) | | |
|---|---|---|---|---|
| | | a | b | $(a^2 + b^2)^{1/2}$ |
| 1 | 4.96 | 0.15 | −0.70 | 0.72 |
| 2 | 5.30 | 3.98 | −6.14 | 7.32 |
| 3 | 5.63 | 4.9 | 1.02 | 5.01 |
| 4 | 5.09 | −1.41 | 0.72 | 1.58 |
| 5 | 5.78 | 0.86 | −0.81 | 1.18 |
| 6 | 5.44 | 1.89 | −5.51 | 5.83 |

TABLE 9

| Embodiment No. | Visible light Transmission Tvis(%) | Transmitted light chromaticity | | |
|---|---|---|---|---|
| | | a | b | $(a^2 + b^2)^{1/2}$ |
| 1 | 93.0 | −0.49 | −0.09 | 0.50 |
| 2 | 92.8 | −0.32 | −0.32 | 0.45 |
| 3 | 92.9 | −0.77 | 0.41 | 0.87 |
| 4 | 92.9 | −0.80 | −0.04 | 0.80 |
| 5 | 92.7 | −0.29 | −0.17 | 0.34 |
| 6 | 92.5 | −0.69 | 0.49 | 0.85 |
| 7 | 92.8 | −0.35 | −0.29 | 0.45 |
| 8 | 92.6 | −0.25 | −0.37 | 0.45 |
| 9 | 92.6 | −0.59 | 0.13 | 0.60 |
| 10 | 92.7 | −0.61 | −0.23 | 0.65 |
| 11 | 92.3 | −0.48 | 0.25 | 0.54 |
| 12 | 93.0 | −0.49 | −0.09 | 0.50 |
| 13 | 93.0 | −0.49 | −0.09 | 0.50 |
| 14 | 92.5 | −0.92 | 0.95 | 1.32 |
| 15 | 92.5 | −0.92 | 0.95 | 1.32 |
| 16 | 92.5 | −0.77 | 1.01 | 1.27 |
| 17 | 93.5 | −0.58 | 0.36 | 0.68 |
| 18 | 93.6 | −0.49 | 0.43 | 0.65 |
| 19 | 93.5 | −0.50 | 0.62 | 0.80 |
| 20 | 93.4 | −0.75 | 0.43 | 0.86 |
| 21 | 93.1 | −0.99 | 0.62 | 1.17 |
| 22 | 93.5 | −0.99 | 0.31 | 1.04 |
| 23 | 93.8 | −0.54 | −0.13 | 0.56 |

TABLE 10

| Comparative Example No. | Visible light Transmission Tvis(%) | Transmitted light chromaticity | | |
|---|---|---|---|---|
| | | a | b | $(a^2 + b^2)^{1/2}$ |
| 1 | 92.3 | −0.34 | −0.22 | 0.40 |
| 2 | 91.6 | −1.35 | 1.50 | 2.02 |
| 3 | 91.7 | −1.45 | −0.21 | 1.47 |
| 4 | 92.1 | −0.28 | −0.30 | 0.41 |
| 5 | 91.8 | −0.56 | −0.13 | 0.57 |
| 6 | 91.3 | −0.97 | 1.26 | 1.59 |

Embodiments 25 through 40, Comparative Examples 7 through 12

Preparation of Stock Liquid

To 1 mol of titanium isopropoxide while stirring in a flask was added 2 mol of acetylacetone dropwise through a dropping funnel. This solution was referred to as titanium oxide stock liquid. This contained $TiO_2$ in an amount of 16.5 mol %.

To 50 g of ethyl silicate ("ETHYL SILICATE 40" manufactured by COLCOAT Ltd.) was added 6 g of 0.1 N hydrochloric acid and 44 g of ethyl cellosolve, and the mixture was stirred for 2 hours at room temperature. This solution was referred to as silicon oxide stock liquid. This contained $SiO_2$ in an amount of 20 mol %.

Production of Liquid Composition for Film Forming

A liquid composition for forming a middle refractive index film was prepared as described below according to the composition ratio shown in Table 11, as coating liquid for the first layer from the glass substrate. The titanium oxide stock liquid, solvent (ethylcellosolve), silicon oxide stock liquid and gold (Au) raw material (chloroauric acid tetrahydrate) were mixed in given amounts in this order, the resulted mixture was stirred for 2 hours at room temperature to obtain liquid composition coating liquid for forming the middle refractive index film (first layer) (M5 through M20). Likewise, liquid composition coating liquid for forming the high refractive index film (second layer) (H5 through H20) were obtained according to the composition ratio shown in Table 12. Likewise, liquid composition coating liquid for forming the high refractive index film (third layer) (L5 through L20) were obtained according to the composition ratio shown in Table 13.

The coating liquid M5 prepared above was coated on one surface of a non-colored transparent glass substrate (refractive index=1.52) of soda lime silicate composition of a thickness of 1.1 mm×10 cm×10 cm by spin coating at a rotation of 3000 rpm for 15 seconds. After air drying, thermal treatment was conducted for 2 minutes at 550 ° C. for coating of the middle refractive index film, then, the coating liquid H5 prepared above was coated on the middle refractive index film by spin coating at a rotation of 2000 rpm for 15 seconds, after air drying, thermal treatment was conducted for 2 minutes at 550° C. to obtain a glass plate coated with a first layer, middle refractive index film having a composition, refractive index, film thickness and optical film thickness shown in Table 14, respectively, a second layer, high refractive index film having a composition, refractive index, film thickness and optical film thickness shown in Table 15, respectively, and a colored low refractive index film having a composition, refractive index, film thickness and optical film thickness shown in Table 16, respectively, (Embodiment 25). Regarding the visible light refractivity Rvis of this glass plate, D source light was allowed to be incident at an angle of 12° from the film surface side coated with the colored film, and the refractivity of only the film surface side (Rvis film surface) shielded against the reflected light from the rear surface (non film surface), and the refractivity including reflection from the rear surface and the film surface side (Rvis both surfaces) were measured. The visible light transmission Tvis (D source light) was measured according to JIS R 3106, the chromaticity of the transmitted light was measured according to JIS Z 8729.

Regarding measuring results, the visible light transmission (Tvis), the chromaticity JS of the transmitted light, and the visible light reflectivity (Rvis film surface and Rvis both surfaces) are as shown in Table 17. The resulting colored film exhibited excellent results regarding chemical resistance and abrasion resistance. When the above-described reflection preventing colored film was coated on both surfaces of the above-described glass substrate, the refractivity index (Rvis both surfaces) including reflection from the front surface side and the rear surface side was lower than 3.0% which is the refractivity index (Rvis both surfaces) when the reflection preventing colored film was coated only on one surface of the glass substrate, and was 1.2%.

In the same manner, reflection preventing colored film coated glass articles coated with a middle refractive index film, high refractive index film and low refractive index film, respectively, having compositions, refractive indices and film thickness as shown in Tables 14 through 16 were obtained using the coating liquid shown in Tables 11 through 13 (M6 to M20, H6 to H20, and L6 to L20) (Embodiments 26 to 40). The resulting measurements of the optical properties are summarized in Table 17.

As shown in Embodiments 25 through 30 and Embodiments 34 through 36, reflection preventing film-coated glass articles were obtained which absorbed red and the transmitted color was blue-green. Namely, when expressed in the Lab color expression system, the transmitted light chromaticity exhibited (a)=−8.4 to −1.1 and (b)=−7.8 to −1.2, and the refractive index of only the film surface side (Rvis film surface) was 0.5% or less. As shown in Embodiments 31 through 33, reflection preventing film-coated glass articles were obtained which absorbed yellow and the transmitted color was blue-violet. Namely, when expressed in the Lab color expression system, the transmitted light chromaticity exhibited (a)=0.3 to 0.8 and (b)=−10.5 to −3.5, and the refractive index of only the film surface side (Rvis film surface) was 0.5% or less. Further, as shown in Embodiments 37 through 40, reflection preventing film-coated glass articles were obtained which absorbed green and the transmitted color was red violet. Namely, when expressed in the Lab color expression system, the transmitted light chromaticity exhibited (a)=2.5 to 9.8 and (b)=−5.3 to −0.8, and the visible light refractivity of only the film surface side (Rvis film surface) was 0.5% or less. All reflection preventing film-coated glass articles in Embodiments 25 through 40 exhibited a visible light transmission (Tvis) of 60% or more.

Reflection preventing colored film-coated glass articles were obtained in the same manner as in Embodiment 29 except that the film thickness of the high refractive index film, middle refractive index film or low refractive index film were changed as shown in Table 19 by controlling the rotation speed in spin coating which is the coating condition of the coating liquid for forming the high refractive index film, the coating liquid for forming the middle refractive index film, or the coating liquid for forming the low refractive index film, using the coating liquid shown in Table 18 (Embodiments 7 through 12). The resulting measurements of the optical properties are as shown in Table 20. In the examples, the visible light reflectivity (Rvis film surface) of only the film surface side was from 3.0 to 4.2%, and lower than that (0.1 to 0.3%) of the Rvis film surface in the embodiments, therefore, the visible light reflection preventing ability of the comparative examples was apparently inferior to that of the embodiments.

TABLE 11

Composition of the first layer coating liquid

| Embodiment No. | Coating liquid No. | Titanium oxide stock liquid (g) | Silicon oxide stock liquid (g) | Au raw material (g) | Solvent (g) |
|---|---|---|---|---|---|
| 25 | M5 | 15.5 | 6.5 | 2.0 | 76.1 |
| 26 | M6 | 17.3 | 7.0 | 1.3 | 73.1 |
| 27 | M7 | 18.5 | 7.8 | 0.7 | 73.1 |
| 28 | M8 | 13.0 | 8.3 | 2.1 | 76.7 |
| 29 | M9 | 14.6 | 9.3 | 1.3 | 74.9 |
| 30 | M10 | 15.8 | 10.0 | 0.7 | 73.6 |
| 31 | M11 | 7.9 | 12.8 | 2.0 | 77.4 |
| 32 | M12 | 8.5 | 14.3 | 1.3 | 76.0 |
| 33 | M13 | 9.4 | 15.3 | 0.7 | 74.7 |
| 34–40 | M14–M20 | 10.0 | 16.8 | 0 | 73.2 |
| 41 | M21 | 11.0 | 18.4 | 0 | 70.6 |

TABLE 12

Composition of the second layer coating liquid

| Embodiment No. | Coating liquid No. | Titanium oxide stock liquid (g) | Silicon oxide stock liquid (g) | Au raw material (g) | Solvent (g) |
|---|---|---|---|---|---|
| 25–33 | H5–H13 | 30.3 | 0 | 0 | 69.7 |
| 34 | H14 | 23.3 | 0 | 2.0 | 74.7 |
| 35 | H15 | 25.8 | 0 | 1.3 | 73.0 |
| 36 | H16 | 27.9 | 0 | 0.7 | 71.4 |
| 37–40 | H17–H20 | 30.3 | 0 | 0 | 69.7 |
| 41 | H21 | 42.4 | 0 | 0 | 57.6 |

TABLE 13

Composition of the third layer coating liquid

| Embodiment No. | Coating liquid No. | Silicon oxide stock liquid (g) | Au raw material (g) | Solvent (g) |
|---|---|---|---|---|
| 25–36 | L5–L16 | 25.0 | 0 | 75.0 |
| 37 | L17 | 19.3 | 2.0 | 77.5 |
| 38 | L18 | 21.3 | 1.3 | 76.3 |
| 39 | L19 | 23.0 | 0.7 | 76.3 |
| 40 | L20 | 24.0 | 0.3 | 75.7 |
| 41 | L21 | 28.8 | 0.4 | 70.8 |

TABLE 14

| Embodiment No. | Middle refractive index film composition (mol %) | | | Refractive index $n_1$ | Film thickness d (nm) | $n_1 \cdot d$ (nm) |
|---|---|---|---|---|---|---|
| | $TiO_2$ | $SiO_2$ | Au | | | |
| 25 | 53.7 | 36.4 | 9.8 | 1.86 | 53 | 99 |
| 26 | 56.8 | 37.1 | 6.1 | 1.86 | 51 | 95 |
| 27 | 57.8 | 39.1 | 3.1 | 1.86 | 52 | 97 |
| 28 | 44.7 | 45.6 | 9.7 | 1.80 | 53 | 95 |
| 29 | 46.5 | 47.6 | 5.9 | 1.80 | 52 | 94 |
| 30 | 48.0 | 49.0 | 3.0 | 1.80 | 51 | 92 |
| 31 | 25.2 | 65.7 | 9.0 | 1.76 | 53 | 93 |
| 32 | 25.5 | 69.0 | 5.5 | 1.76 | 52 | 92 |
| 33 | 26.9 | 70.3 | 2.8 | 1.76 | 51 | 90 |
| 34 | 27.0 | 73.0 | 0 | 1.76 | 50 | 88 |
| 35 | 27.0 | 73.0 | 0 | 1.76 | 50 | 88 |
| 36 | 27.0 | 73.0 | 0 | 1.76 | 51 | 90 |
| 37 | 27.0 | 73.0 | 0 | 1.76 | 51 | 90 |
| 38 | 27.0 | 73.0 | 0 | 1.76 | 50 | 88 |
| 39 | 27.0 | 73.0 | 0 | 1.76 | 50 | 88 |
| 40 | 27.0 | 73.0 | 0 | 1.76 | 50 | 88 |

TABLE 15

| Embodiment No. | High refractive index film composition (mol %) | | | Refractive index $n_2$ | Film thickness d (nm) | $n_2 \cdot d$ (nm) |
|---|---|---|---|---|---|---|
| | $TiO_2$ | $SiO_2$ | Au | | | |
| 25 | 100 | 0 | 0 | 2.20 | 85 | 187 |
| 26 | 100 | 0 | 0 | 2.20 | 84 | 185 |
| 27 | 100 | 0 | 0 | 2.20 | 84 | 185 |
| 28 | 100 | 0 | 0 | 2.20 | 84 | 185 |
| 29 | 100 | 0 | 0 | 2.20 | 85 | 187 |
| 30 | 100 | 0 | 0 | 2.20 | 84 | 185 |
| 31 | 100 | 0 | 0 | 2.20 | 84 | 185 |
| 32 | 100 | 0 | 0 | 2.20 | 85 | 187 |
| 33 | 100 | 0 | 0 | 2.20 | 84 | 185 |
| 34 | 89.2 | 0 | 10.8 | 2.20 | 86 | 189 |
| 35 | 93.3 | 0 | 6.7 | 2.20 | 85 | 187 |
| 36 | 96.6 | 0 | 3.4 | 2.20 | 84 | 185 |
| 37 | 100 | 0 | 0 | 2.20 | 84 | 185 |
| 38 | 100 | 0 | 0 | 2.20 | 84 | 185 |
| 39 | 100 | 0 | 0 | 2.20 | 84 | 185 |
| 40 | 100 | 0 | 0 | 2.20 | 84 | 185 |

TABLE 16

| Embodiment No. | Low refractive index film composition (mol %) | | Refractive index $n_2$ | Film thickness d (nm) | $n_2 \cdot d$ (nm) |
|---|---|---|---|---|---|
| | $SiO_2$ | Au | | | |
| 25 | 100 | 0 | 1.46 | 81 | 118 |
| 26 | 100 | 0 | 1.46 | 79 | 115 |
| 27 | 100 | 0 | 1.46 | 78 | 114 |
| 28 | 100 | 0 | 1.46 | 79 | 115 |
| 29 | 100 | 0 | 1.46 | 79 | 115 |
| 30 | 100 | 0 | 1.46 | 80 | 117 |
| 31 | 100 | 0 | 1.46 | 80 | 117 |
| 32 | 100 | 0 | 1.46 | 80 | 117 |
| 33 | 100 | 0 | 1.46 | 81 | 118 |
| 34 | 100 | 0 | 1.46 | 81 | 118 |
| 35 | 100 | 0 | 1.46 | 81 | 118 |
| 36 | 100 | 0 | 1.46 | 82 | 120 |
| 37 | 91.6 | 8.4 | 1.46 | 83 | 121 |
| 38 | 94.9 | 5.1 | 1.46 | 82 | 120 |
| 39 | 97.4 | 2.6 | 1.46 | 83 | 121 |
| 40 | 98.7 | 1.3 | 1.46 | 82 | 120 |

TABLE 17

| Embodiment No. | TVIS (%) | Transmitted light chromaticity | | RVIS (%) | |
|---|---|---|---|---|---|
| | | a | b | Film surface | Both surfaces |
| 25 | 66.2 | −8.4 | −7.8 | 0.2 | 3.0 |
| 26 | 74.1 | −5.6 | −5.2 | 0.2 | 3.6 |
| 27 | 82.0 | −2.8 | −2.6 | 0.3 | 4.0 |
| 28 | 73.4 | −3.1 | −6.5 | 0.2 | 3.2 |
| 29 | 82.3 | −2.1 | −4.3 | 0.2 | 3.5 |
| 30 | 91.1 | −1.1 | −2.1 | 0.3 | 3.7 |
| 31 | 64.8 | 0.8 | −10.5 | 0.1 | 3.2 |
| 32 | 73.2 | 0.5 | −7.0 | 0.2 | 3.5 |
| 33 | 81.6 | 0.3 | −3.5 | 0.3 | 4.1 |
| 34 | 71.0 | −6.9 | −3.4 | 0.1 | 3.3 |
| 35 | 81.0 | −4.6 | −2.3 | 0.2 | 3.5 |
| 36 | 91.0 | −2.3 | −1.2 | 0.3 | 3.7 |
| 37 | 76.8 | 9.8 | −5.3 | 0.2 | 3.2 |
| 38 | 81.2 | 6.5 | −3.5 | 0.2 | 3.8 |
| 39 | 85.6 | 3.3 | −1.8 | 0.2 | 4.1 |
| 40 | 85.6 | 2.5 | −0.8 | 0.3 | 4.1 |

TABLE 18

| | | Film composition of each layer (mol %) | | |
|---|---|---|---|---|
| Layer | Liquid used | $TiO_2$ | $SiO_2$ | AU |
| 7–12 First layer | M9 | 26.9 | 70.3 | 2.8 |
| Second layer | H9 | 100 | 0 | 0 |
| Third layer | L9 | 0 | 100 | 0 |

TABLE 19

| Comparative Example No. | First layer | | | Second layer | | | Third layer | | |
|---|---|---|---|---|---|---|---|---|---|
| | Refractive index $n_1$ | Film thickness d(nm) | $n_1 \cdot d$ (nm) | $n_2$ | Film thickness d(nm) | $n_2 \cdot d$ (nm) | Refractive index $n_3$ | Film thickness d(nm) | $n_3 d$ (nm) |
| 7  | 1.76 | 30 | 53  | 2.20 | 85  | 187 | 1.46 | 80  | 117 |
| 8  | 1.76 | 75 | 132 | 2.20 | 84  | 185 | 1.46 | 81  | 118 |
| 9  | 1.76 | 50 | 88  | 2.20 | 60  | 132 | 1.46 | 80  | 117 |
| 10 | 1.76 | 50 | 88  | 2.20 | 110 | 242 | 1.46 | 82  | 120 |
| 11 | 1.76 | 50 | 88  | 2.20 | 80  | 176 | 1.46 | 60  | 88  |
| 12 | 1.76 | 50 | 88  | 2.20 | 81  | 178 | 1.46 | 120 | 175 |

TABLE 20

| | TVIS (%) | Transmitted light chromaticity | | RVIS (%) | |
|---|---|---|---|---|---|
| | | a | b | Film thickness | Both sides |
| 7  | 78.0 | −0.9 | −3.4 | 3.0 | 6.3 |
| 8  | 75.2 | −0.7 | −3.3 | 4.0 | 7.1 |
| 9  | 76.9 | −0.3 | −3.9 | 3.2 | 6.6 |
| 10 | 74.0 | −0.2 | −3.1 | 4.2 | 7.6 |
| 11 | 76.9 | −0.3 | −3.9 | 3.2 | 6.6 |
| 12 | 74.0 | −0.2 | −3.1 | 4.2 | 7.6 |

Embodiment 41

One surface of a non-colored float glass plate having high strain point (strain point: 575° C.) of a thickness of 3.2 mm×59 cm×89 cm of which the surface had been abraded with a cerium oxide abrading material and washed was coated with coating liquid M21 having a composition shown in Table 11 by the flexo coating method, and irradiated by ultraviolet rays for 30 seconds at an irradiation strength of 15 mW/cm² from a distance of 10 cm using a high pressure mercury lamp of 160 W/cm, to form a first layer film. Then, the first layer film was coated with coating liquid H21 having a composition shown in Table 12, and irradiated by ultraviolet rays for 30 seconds at an irradiation strength of 15 mW/cm² from a distance of 10 cm using a high pressure mercury lamp of 160 W/cm, to form a second layer film. Then, the second layer film was coated with coating liquid L21 having a composition shown in Table 13, and heated at a glass temperature of 250° C. in a conveyer transporting type infrared ray heating furnace (internal temperature: 300° C.), to form on the surface of the glass plate a reflection preventing film composed of the middle refractive index film in the first layer, the high refractive index film in the second layer and, the colored low refractive index film in the third layer.

On parts (width: about 10 mm) on the opposite side surface (second surface) to the surface (first surface) on which the refractive preventing film was formed of this glass plate, black ink was printed as a light shielding layer by silk screen printing, then, an electroconductive silver paste was printed as an earth electrode on this black printed layer, and calcinated at 500° C. On the whole surface of this surface (second surface), a multi-layer film composed of silver was formed as an electromagnetic wave shielding layer by a sputtering method. This multi-layer film composed of silver was formed on one surface of the non-colored float glass plate on which no reflection preventing film had been formed, then, the transmitted color tone (chromaticity) exhibited (a)=−2.4 and (b)=0.7 when expressed by the Lab color expression system, and exhibited yellow-green. In the case wherein a glass plate carrying on the first surface thereof a reflection preventing film formed and carrying on the second surface thereof an electromagnetic wave shielding layer formed, respectively was plated so that the electromagnetic wave shielding layer was in close contact with PDP, a plastic film (Anti-glare film) on which slight dents and projections had been formed was pasted as a fracture scattering preventing film in the case of breakage of glass on the electromagnetic wave shielding layer of the glass plate so that Newton ring, an interference fringe is not formed, to obtain an optical filter for PDP. The transmitted color tone of the resulted optical filter exhibited a=0.2 and b=0.3, and exhibited neutral gray.

Embodiment 42

A commercially available reflection preventing film (obtained by laminating a plurality of films composed of materials having different refractive indices, and by conducting vapor deposition) also works as a fracture scattering preventing film was pasted instead of the plastic film on which slight dents and projections had been formed on the electromagnetic wave shielding layer of the glass plate in Embodiment 41, to obtain an optical filter for PDP. The optical properties were approximately the same as those of Embodiment 41.

INDUSTRIAL APPLICABILITY

As described in the detailed description of the invention, according to the present invention, a low reflection glass article having a visible light reflectivity on film surface of 0.5% or less is obtained. Further, according to the present invention, there are provided a glass article coated with a reflection preventing colored film which has excellent ability for preventing reflection of visible light, in addition, can freely control the tone of transmitted light, and has high visible light transmission, and an optical filter for PDP using the same.

What is claimed is:

1. A low reflection glass article which is prepared by laminating a first layer which has a middle refractive index ($n_1$) from 1.60 to 1.95 and has a film thickness of (60 to 130 nm)/$n_1$, a second layer which has a high refractive index ($n_2$) which is in a range from 1.91 to 2.60 and higher than the refractive index of said first layer by at least 0.20 and has a film thickness of (140 to 230 nm)/$n_2$, and a third layer which has a low refractive index ($n_3$) which is in a range from 1.35 to 1.59 and lower than the refractive index of said first layer by at least 0.20 and has a film thickness of (110 to 150 nm)/$n_3$ in this order on a transparent glass substrate having a refractive index from 1.47 to 1.53, wherein said second layer contains silicon oxide in an amount from 0 to 30 mol % and titanium oxide in an amount from 70 to 100 mol %, said third layer contains a silicon oxide in an amount from 85 to 100 mol % and titanium oxide in an amount from 0 to 10 mol %, and said first layer contains a silicon oxide in an amount from 15 to 80 mol % and titanium oxide in an amount from to 70 mol %, and at least one layer from said first, second and third layers contains fine gold particles in an amount from 0.5 to mol %.

2. The low reflection glass article according to claim 1, wherein said first layer, second layer and third layer have refractive indices $n_1$, $n_2$ and $n_3$, respectively, which satisfy the following formula (2)

$$0.95 \times n_2 \times n_3 \leq n_1^2 \leq 1.10 \times n_2 \times n_3 \qquad (2).$$

3. The low reflection glass article according to claim 1, wherein, when said transparent glass substrate is a glass plate having a thickness from 0.5 to 5.0 mm.

4. The low reflection glass article according to claim 3, wherein said glass article has transmitted color represented by chromaticity of (a) from −15.0 to 20.0 and (b) from −15.6 to 3.0, when expressed by the Lab color expression system.

5. The low reflection glass article according to claim 4, wherein said glass article has transmitted color represented by chromaticity of (a) from −10.0 to 10.0 and (b) from −12.0 to 0.0, when expressed by the Lab color expression system.

6. The low reflection glass article according to claim 1, wherein, said glass article has a visible light reflectivity (visible light reflectivity of both surfaces including reflection of film surface and reflection of rear surface of light incidented from the coated film side at an incident angle of 12°) of 0.5% or less.

7. The low reflection glass article according to claim 1, wherein said transparent glass substrate is a transparent glass plate having high strain point.

8. An optical filter for a plasma display panel obtained by providing an electromagnetic shielding layer on the opposite side surface to the surface coated with the reflection preventing colored film of the low reflection glass article described in any of claims 3, 4, 5 or 7.

9. The optical filter for a plasma display panel according to claim 8, wherein said optical filter has transmitted color represented by chromaticity of (a) from −3.0 to 3.0 and (b) from −3.0 to 3.0, when expressed by the Lab color expression system.

10. A plasma display panel obtained by using as a front surface glass the low reflection glass article described in any of claims 3, 4, 5 or 7.

11. A low reflection glass article which is prepared by laminating a first layer which has a middle refractive index ($n_1$) from 1.60 to 1.95 and has a film thickness of (60 to 130 nm)/$n_1$, a second layer which has a high refractive index ($n_2$) which is in a range from 1.91 to 2.60 and higher than the refractive index of said first layer by at least 0.20 and has a film thickness of (140 to 230 nm)/$n_2$, and a third layer which has a low refractive index ($n_3$) which is in a range from 1.35 to 1.59 and lower than the refractive index of said first layer by at least 0.20 and has a film thickness of (110 to 150 nm)/$n_3$ in this order on a transparent glass substrate having a refractive index from 1.47 to 1.53, wherein said second layer contains titanium oxide and bismuth oxide an amount from 70 to 100 mol % in total, said third layer contains a silicon oxide in an amount from 50 to 100 mol % and at least one metal oxide selected from a group consisting of titanium oxide and bismuth oxide in an amount from 0 to 10 mol % in total, and said first layer contains a silicon oxide in an amount from 15 to 80 mol % and titanium oxide and bismuth oxide in an amount from 20 to 70 mol % in total, wherein, when the mol ratio of $TiO_2$, $Bi_2O_3$ and $SiO_2$ in a $TiO_2$—$Bi_2O_3$—$SiO_2$ ternary composition is expressed by a coordinate point ($TiO_2$ mol %, $Bi_2O_3$ mol %, $SiO_2$ mol %), said first layer contains the titanium oxide, bismuth oxide and silicon oxide in a ratio within a rectangle MNOP made by M(30.5, 0.5, 69), N(68, 1, 31), O(3.5, 65.5, 31) and P(1.5, 29.5, 69), said second layer contains the titanium oxide, bismuth oxide and silicon oxide in a ratio within a rectangle ABCD made by A(69, 1, 30), B(99, 1, 0), C(5, 95, 0) and D(3, 67, 30), and said third layer contains the titanium oxide, bismuth oxide and silicon oxide in a ratio within a triangle YZA' made by Y(0, 0, 100), Z(29.5, 0.5, 70) and A'(1.5, 28.5, 70).

12. The low reflection glass article according to claim 11, wherein said first layer contains the titanium oxide, bismuth oxide and silicon oxide in a ratio within a rectangle QRST made by Q(39, 1, 60), R(58.5, 1.5, 40), S(24, 36, 40) and T(16, 24, 60), said second layer contains the titanium oxide, bismuth oxide and silicon oxide in a ratio within the rectangle EFGH made by E(78, 2, 20), F(98, 2, 0), G(40, 60, 0) and H(32, 48, 20), and said third layer contains the titanium oxide, bismuth oxide and silicon oxide in a ratio within a triangle YB'C' made by Y(0, 0, 100), B'(19.5, 0.5, 80) and C'(8, 12, 80).

13. The low reflection glass article according to claim 11, wherein said first layer contains the titanium oxide, bismuth oxide and silicon oxide in a ratio within a rectangle UVWX made by U(43, 2, 55), V(53, 2, 45), W(27.5, 27.5, 45) and X(22.5, 22.5, 55), said second layer contains the titanium oxide, bismuth oxide and silicon oxide in a ratio within a rectangle IJKL made by I(87, 3, 10), J(97, 3, 0), K(50, 50, 0) and L(45, 45, 10), and said third layer contains the titanium oxide, bismuth oxide and silicon oxide in a ratio within a triangle YD'E' made by Y(0, 0, 100), D'(9.5, 0.5, 90) and E'(5, 5, 90).

14. The low reflection glass article according to claim 11, wherein at least one layer of said first layer, second layer and third layer contains a fine particle of at least one metal selected from the IB group and VIII group of the Periodic Table of elements, in an amount from 0.5 to 20 mol %.

15. The low reflection glass article according to claim 11, wherein said first layer, second layer and third layer have refractive indices $n_1$, $n_2$ and $n_3$, respectively, which satisfy the following formula:

$$0.95 \times n_2 \times n_3 \leq n_1^2 \leq 1.10 \times n_2 \times n_3.$$

16. The low reflection glass article according to claim 11, wherein said transparent glass substrate is a glass plate having a thickness from 0.5 to 5.0 mm.

17. The low reflection glass article according to claim 16, wherein said glass article has a transmitted color represented by chromaticity of (a) from −15.0 to 20.0 and (b) from −15.0 to 3.0, when expressed by the Lab color expression system.

18. An optical filter for a plasma display panel obtained by providing an electromagnetic shielding layer on the surface opposite to the surface coated with the reflection preventing film of the low reflection glass article described in claim 16.

19. The optical filter for plasma display panel according to claim 18, wherein said optical filter has transmitted color represented by chromaticity of (a) from −3.0 to 3.0 and (b) from −3.0 to 3.0 when expressed by the Lab color expression system.

20. A plasma display panel obtained by using as a front surface glass the low reflection glass article described in claim 16.

21. The low reflection glass article according to claim 17, wherein said glass article has a transmitted color represented by chromaticity of (a) from −10.0 to 10.0 and (b) from −12.0 to 0.0, when expressed by the Lab color expression system.

22. The low reflection glass article according to claim 11, wherein said glass article has a visible light reflectivity of both surfaces including reflection of film surface and reflection of rear surface of light incident from the coated film side at an incident angle of 12° of 0.5% or less.

23. The low reflection glass article according to claim 11, wherein said transparent glass substrate is a transparent glass plate having high strain point.

* * * * *